(12) United States Patent
Buchko et al.

(10) Patent No.: US 7,833,002 B2
(45) Date of Patent: Nov. 16, 2010

(54) LIFT MECHANISM FOR TOOLING THAT ACTS ON A WEB IN A PACKAGING MACHINE

(75) Inventors: Raymond G. Buchko, Neenah, WI (US); Dwayne C. Long, New London, WI (US)

(73) Assignee: CP Packaging, Inc., Appleton, WI (US)

( * ) Notice: Subject to any disclaimer, the term of this patent is extended or adjusted under 35 U.S.C. 154(b) by 309 days.

(21) Appl. No.: 12/057,932

(22) Filed: Mar. 28, 2008

(65) Prior Publication Data

US 2009/0241485 A1 Oct. 1, 2009

(51) Int. Cl.
*B65B 47/00* (2006.01)
*B29C 51/26* (2006.01)

(52) U.S. Cl. .......................... 425/383; 53/559; 53/561; 425/388; 425/454

(58) Field of Classification Search ................. 425/383, 425/388, 454; 53/559, 561
See application file for complete search history.

(56) References Cited

U.S. PATENT DOCUMENTS

| | | | | |
|---|---|---|---|---|
| 3,343,336 | A | * | 9/1967 | Bradford .................... 53/329.4 |
| 3,524,298 | A | | 8/1970 | Hamilton |
| 3,805,486 | A | | 4/1974 | Mahaffy et al. |
| 3,808,772 | A | | 5/1974 | Turtschan |
| 4,064,676 | A | * | 12/1977 | King et al. .................... 53/559 |
| 4,094,127 | A | | 6/1978 | Romagnoli |
| 4,883,419 | A | * | 11/1989 | Queirel ....................... 425/388 |
| 4,894,977 | A | | 1/1990 | Rittinger et al. |
| 4,897,985 | A | | 2/1990 | Buchko et al. |
| 4,915,283 | A | * | 4/1990 | Buchko et al. .............. 226/173 |
| 4,938,001 | A | | 7/1990 | Vico |
| 4,951,444 | A | | 8/1990 | Epstein et al. |
| 4,999,979 | A | | 3/1991 | Vico |
| 5,170,611 | A | | 12/1992 | Buchko |
| 5,205,110 | A | | 4/1993 | Buchko |
| 5,517,805 | A | | 5/1996 | Epstein |
| 6,085,497 | A | * | 7/2000 | Natterer ....................... 53/559 |
| 2004/0050020 | A1 | | 3/2004 | Hanson |

FOREIGN PATENT DOCUMENTS

EP 0219379 4/1987

OTHER PUBLICATIONS

"Welcome to the World of Multivac® Packaging Machines", Multivac brochure 1988.

(Continued)

*Primary Examiner*—James Mackey
(74) *Attorney, Agent, or Firm*—Boyle Fredrickson, S.C.

(57) ABSTRACT

A packaging apparatus has a lift mechanism to lower and raise a tool, such as a formation box that functions to form cavities in a web of flexible material. The lift mechanism has a series of arms, supported by belt driven carriages, which move in tandem to raise and lower the formation box. The arms are arranged into two sets such that when the arms within each set are moved closer to one another, the formation box is raised, and when the arms within each set are moved away from one another, the formation box is lowered. The common driving of all arms by a belt allows the indexing of the formation box to be well controlled.

22 Claims, 8 Drawing Sheets

OTHER PUBLICATIONS

"Thermoforming", Moderm Plastics Encyclopedia 1986-1987, Dave Irwin, pp. 322-330.

Klockner-Hooper Packaging Machines/Model 4000 advertisement, Nov. 1988.

Irwin Research Development, Inc. Engineering Drawing for Platen Assembly dated Oct. 23, 1984.

Irwin Research Development, Inc. Engineering Drawing for Main Drive Assembly dated Oct. 23, 1984.

* cited by examiner

LIFT MECHANISM FOR TOOLING THAT ACTS ON A WEB IN A PACKAGING MACHINE

BACKGROUND AND SUMMARY OF THE INVENTION

The present invention relates generally to packaging systems that deform a web of flexible material into product-holding cavities and, more particularly, to a lift mechanism that raises and lowers a tool such as a formation box incorporated in the packaging system.

Conventional packaging systems that deform a web of flexible material into product-holding cavities, such as described in U.S. Pat. No. 4,915,283, have a forming tool that is indexed between a raised and a lowered position by a motor and cam-type arrangement in which structure defining a series of cam slots is mounted to the forming tool, and actuating arms are mounted to and rotatable with a pair of rotatable members that are driven through a timing belt or the like in response to rotation of the motor output shaft. A cam follower, in the form of a roller member, is mounted to each arm and is engaged within the cam slot, and alternating clockwise/and counterclockwise rotation of the rotatable members cause back and forth movement of the rollers within the cam slots to lift and lower the forming tool in an indexing fashion. One of the drawbacks of such conventional designs is the eccentricities involved in translating rotational movement of the lift arm into vertical movement of the forming tool, which requires relatively close tolerances in manufacture and results in uneven wear between the rollers and the surfaces of the cam slots.

Therefore, one object of the present invention is to provide a lift mechanism for raising and lowering a tool, such as a formation box or the like, which eliminates the eccentricities of cam-type designs and which is capable of being precisely controlled. In this regard, in accordance with one aspect of the invention, a lift mechanism operatively associated with a tool of a packaging apparatus that acts on web material includes a pair of arms coupled to the tool, which are moveable between a first position and a second position. More particularly, the pair of arms raises the tool when moved from the first position to the second position. The lift mechanism further includes a slave drive coupled to the pair of arms and adapted to translate between a third position and a fourth position. The slave drive moves the pair of arms from the first position to the second position so as to raise the forming box when translated from the third position to the fourth position, and moves the pair of arms from the second position to the first position so as to lower the forming box when translated from the fourth position to the third position. A master drive is coupled to the slave drive and is adapted to translate the slave drive between the third and fourth positions.

According to another aspect, the invention is directed to a tool apparatus for a packaging assembly that acts on a sheet of web material, such as by forming the web material to define a series of cavities for receiving products to be packaged. The tool apparatus includes a lift mechanism operatively associated with a tool for moving the tool between a lowered position and a raised position. The lift mechanism includes a pair of arms associated with the tool, and a slave roller to which the pair of arms are associated. The slave roller is moveable between a first position and a second position along a linear path that is perpendicular to the path of movement of the tool. The slave roller positions the tool at the lowered position when moved to the first position, and positions the tool at the raised position when moved to the second position. The lift mechanism further includes a master roller associated with the slave roller and operative to move the slave roller along the linear path between the first position and the second position.

According to another aspect of the invention, a packaging apparatus includes a web supply containing a sheet of web material and a web advancement assembly associated with the web supply. The packaging apparatus further includes a cavity formation assembly adapted to form cavities in the sheet of web material. The cavity formation assembly includes a formation box that is reciprocated between a lowered position and a raised position by movement of a pair of arms in a cooperative spaced arrangement, wherein movement of the arms towards one another raises the formation box and movement of the arms away from one another lowers the formation box.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
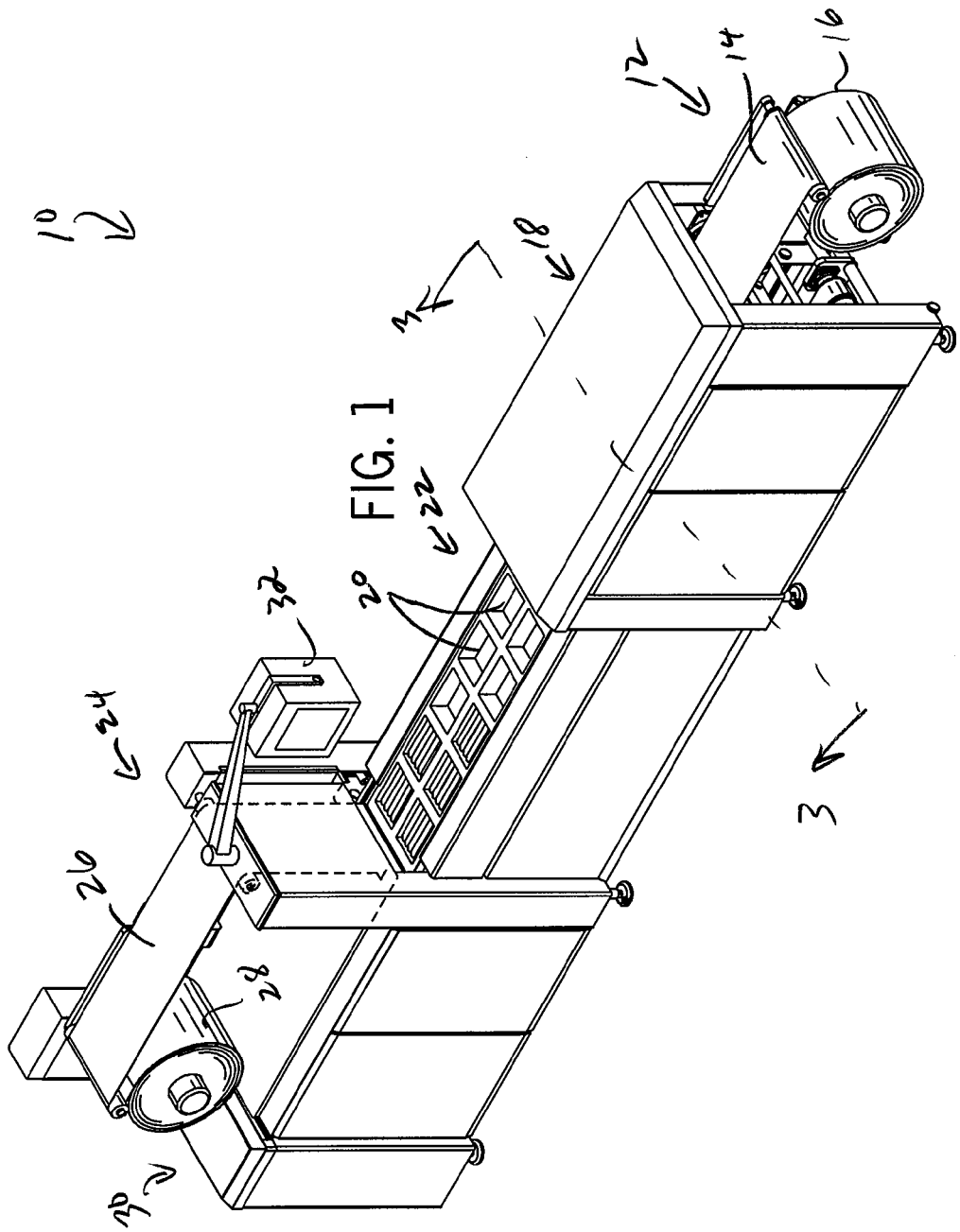
FIG. 1 is an isometric view of a packaging machine constructed according to an aspect of the present invention.

FIG. 1 illustrates a packaging machine 10 that generally includes a lower web supply station 12 for supplying a lower web 14 of flexible web material from a supply roll 16 to a formation station 18. The lower web 14 of flexible material is advanced to the formation station whereupon cavities 20 are formed in the lower web 14. The deformed lower web 14 is then presented to a loading station 22 whereupon a user or machine loads products, e.g., hot dogs, cheese, meat, etc. into the cavities 20. After product is loaded into the cavities 20, the lower web material 14 is advanced to an upper web supply station 24 that supplies an upper web 26 of flexible material from a supply roll 28. As is known in the art, upper web 26 of flexible material is placed over the loaded cavities 20, and the upper and lower web material is then advanced to a sealing station 30 that evacuates the loaded cavities 20 and seals the upper and lower web material together. As known in the art, the sealing station 30 may include a heating assembly that heats the upper web 26 of flexible material to impart flexibility to the upper web 26 prior to its sealing with the lower web 14 of flexible material. The sealed packages may then be presented to a cutting station (not shown), labeling station (not shown), and bulk packaging station (not shown) as generally understood in the art. As is further known in the art, the packing machine 10 may also include a display unit 32 that presents a touch screen, for instance, to allow a user to control the packaging machine 10 while proximate the loading station 22.

Figure 2:
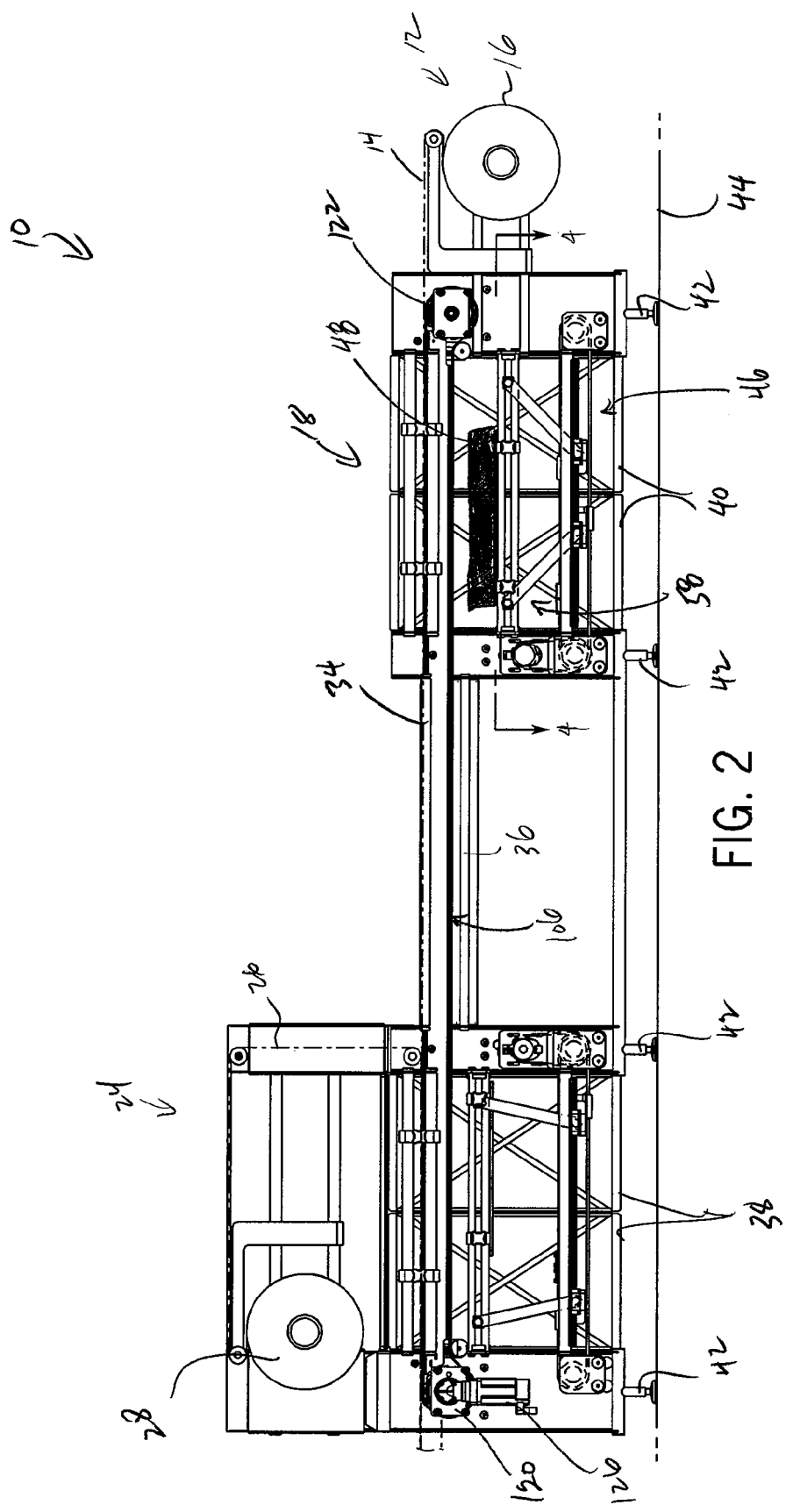
FIG. 2 is a side elevation view of the packaging machine of FIG. 1, with guards and covers removed to expose the components of the machine.

With further reference to FIG. 2, the various components of the packaging machine 10 are supported by a frame assembly that includes a pair of spaced parallel upper frame members 34, and lower spaced frame members such as shown at 36, 38, and 40. Legs 42 support the frame members in a raised position above a support surface such as a floor 44.

Figure 3:
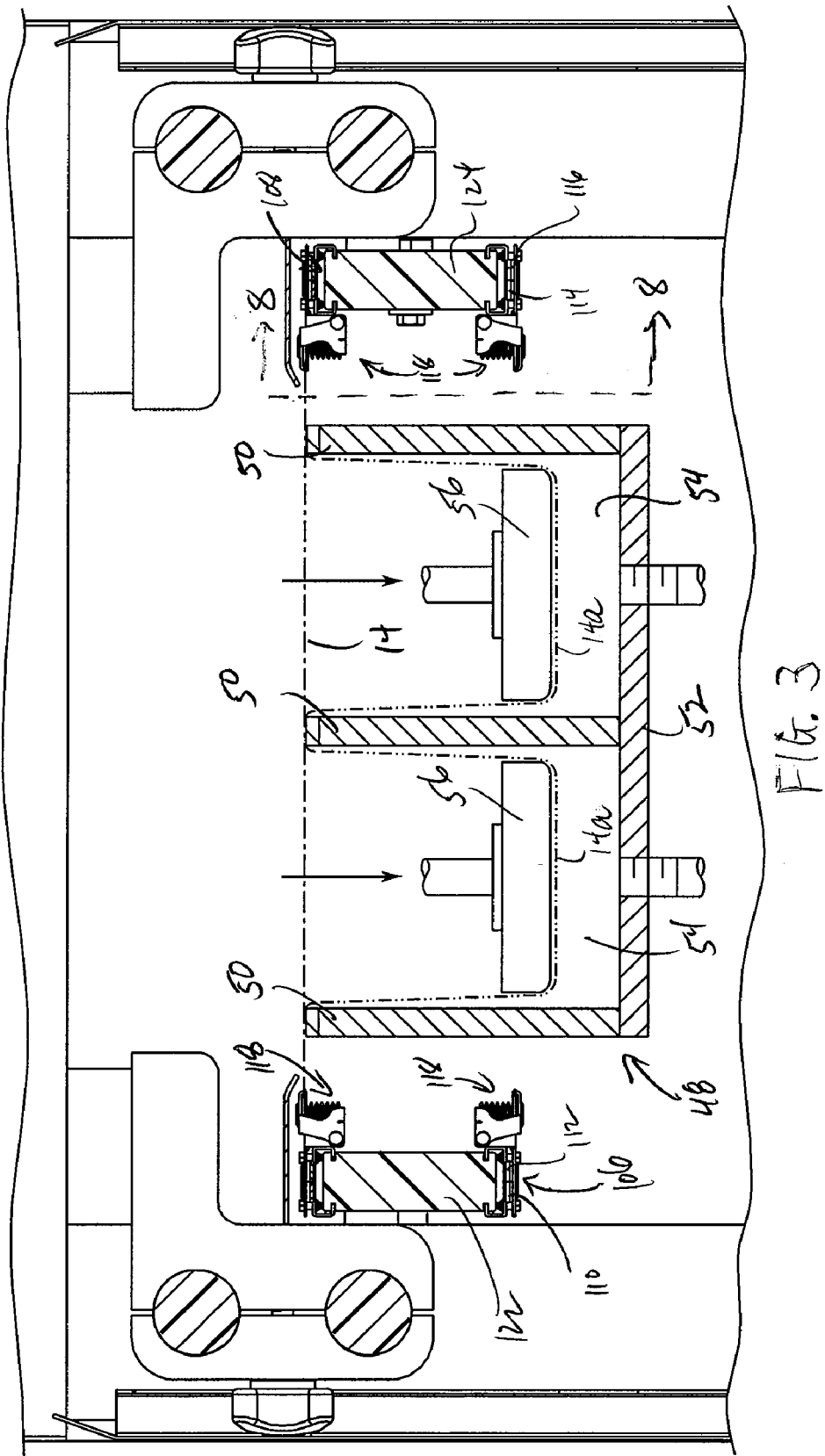
FIG. 3 is a section view of the packaging machine of FIG. 1 taken along line 3-3 of FIG. 1.

The formation station 18 includes a lift mechanism 46 that indexes a tool, namely a formation box 48, between a lowered position and a raised position. Referring briefly to FIG. 3, the formation box 48 is defined by a series of spaced and parallel walls 50 commonly supported by a base 52. The spacing between the parallel walls 50 and the base collectively forms recesses or cavities 54 that may be evacuated using a vacuum (not shown) so as to draw the lower web material 14 into the cavities 54. More particularly, when the formation box 48 is in its fully raised position, the formation box 48 abuts an underside of lower web material 14. The cavities 54 may then be evacuated to draw the lower web 14 of flexible material downward into the cavities 54 to deform the lower web to a deformed condition, shown at 14a. Separate assist members 56 may also be used to help force the lower web 14 of flexible material into cavities 54 so as to deform the lower web 14 of flexible material. This process forms a number of cavities 20 in the lower web 14 that may be used to receive products as described with respect to FIG. 1.

Figure 4:
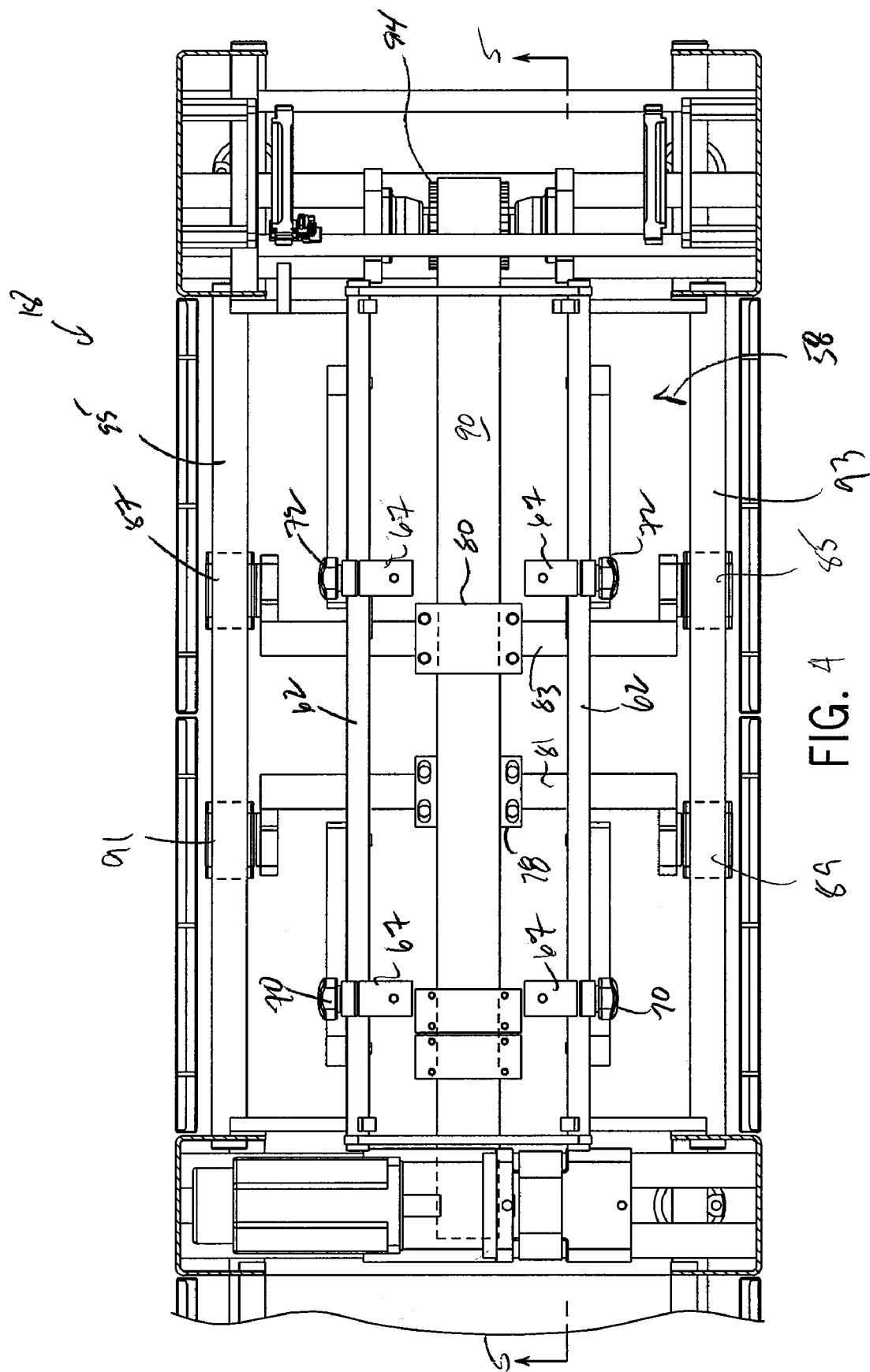
FIG. 4 is a section view of the packaging machine of FIG. 1 taken along line 4-4 of FIG. 2.
Figure 5:
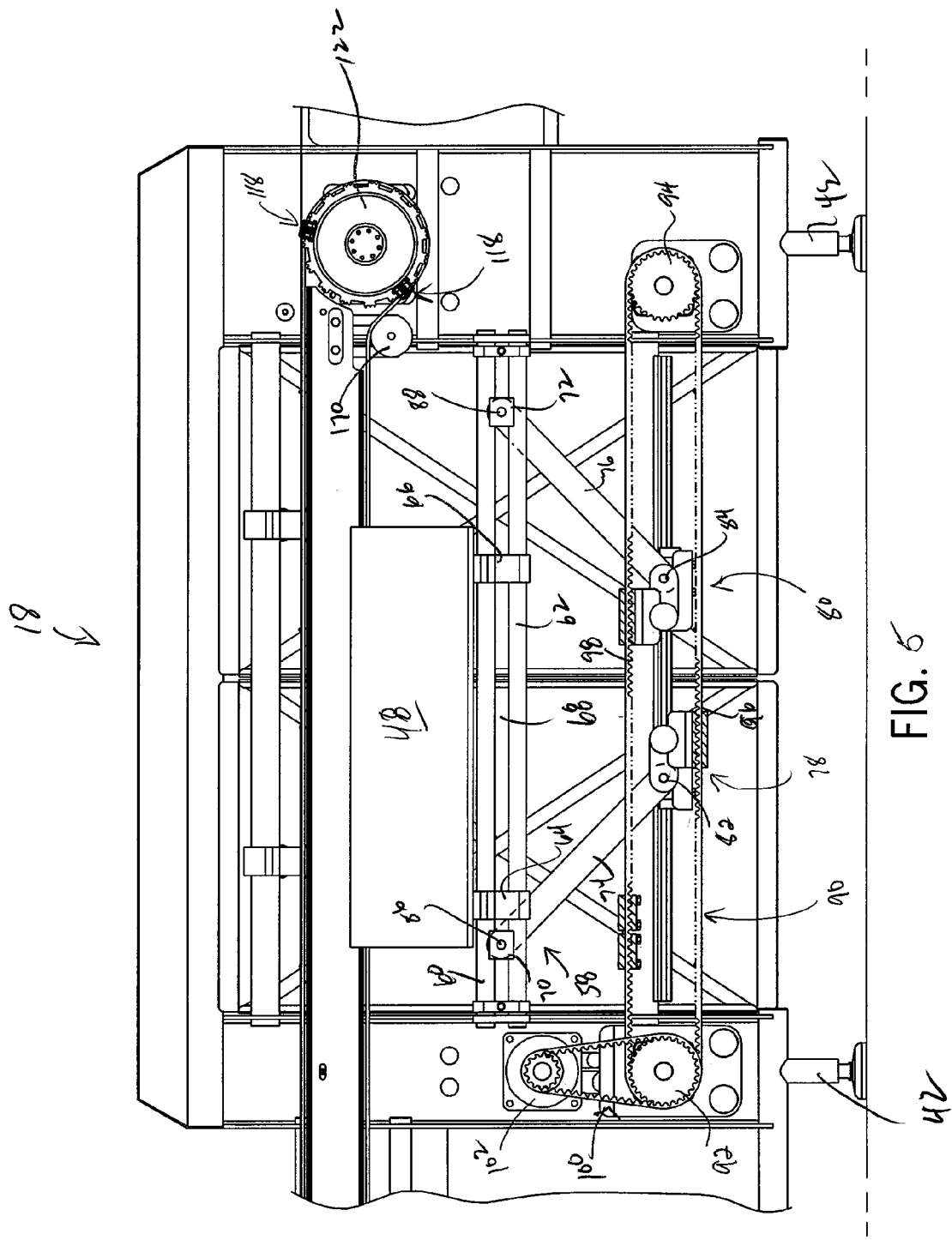
FIG. 5 is a section view of the formation station of the packaging machine of FIG. 1 taken along line 5-5 of FIG. 4.

Referring again to FIG. 2 and with further reference to FIGS. 4 and 5, the formation box 48 is supported by a rack or frame 58 that includes a pair of plates 60, 62 oriented parallel to one another and coupled by a pair of braces 64, 66. The formation box 48 is mounted to the rack 58 by brackets 67. A pair of braces 64, 66 hold the plates 60, 62, so that a slot 68 is formed between the plates 60, 62. The slot 68 defines a track along which a pair of rollers 70, 72 may translate. The rollers 70, 72 are each coupled to an arm 74, 76, respectively, which are connected to carriages 78, 80, respectively. The arms 74, 76 are connected to the rollers 70, 72 and carriages 78, 80 by pivot connections, generally shown at 82, 84, 86, and 88. These pivot connections allow the arms 74,76 to pivot relative to the carriages 78, 80 and the rollers 70, 72. As shown in FIG. 4, each carriage 78, 80 supports a pair of arms, of which a single arm is shown for each carriage in FIG. 2.

Figure 6:
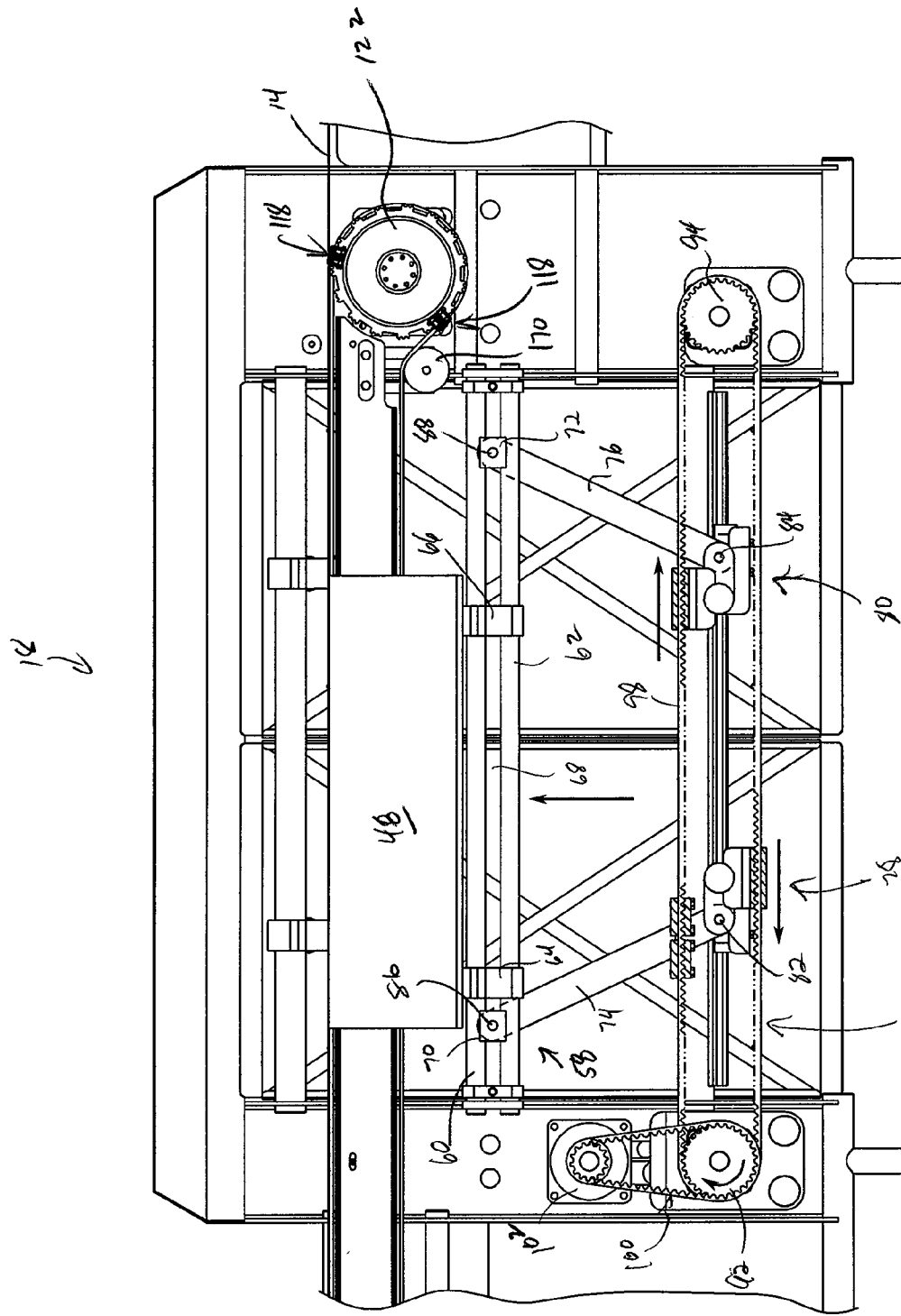
FIG. 6 is a view similar to that of FIG. 5 showing a formation box of the formation station lifted to a raised position.

The carriages 78, 80 are coupled, in a fixed connection, to a driven belt 90 that is trained around a driven wheel or pulley 92 and an idler wheel or pulley 94. As illustrated in FIG. 5, carriage 78 is connected to a lower run or belt portion 96 and carriage 80 is connected to an upper run or belt portion 98. The driven pulley 92 is driven by a drive belt 100 trained about the driven pulley 92 and a drive pulley 102. Rotation of drive pulley 102 causes rotation of driven pulley 92. As the driven pulley 92 is rotated, the driven belt 90 is rotated about its path defined by driven pulley 92 and idlerr pulley 94. Rotation of the driven belt 90 in a clockwise direction, resulting from a clockwise rotation of driven pulley 92, causes the carriages 78, 80 to move away from one another. Specifically, during a clockwise rotation of the driven pulley 92, the driven belt 90 causes carriage 78 to move toward the driven pulley 92 and causes carriage 80 to move toward the follower pulley 94. This movement also causes arms 74, 76 to pivot about pivots 82, 84, respectively. Moreover, the arms 74, 76 are caused to pivot about pivots 86, 88, respectively. Ultimately, this results in the arms 74, 76 moving toward a more upright position, which causes the rollers 70, 72 to roll within slot 68 toward one another and, as a result, raise the formation box 48, as shown in FIG. 6. Similarly, when the driven pulley 92 and the driven belt 90 are rotated in a counterclockwise rotation, the carriages 78, 80 move toward one another and cause the arms 74, 76 to lower the formation box 48, such as shown in FIG. 5. In this regard, the driven belt 90 is a slave to the drive belt 100, such that the driven belt 90 is not translated along its rotational path until the drive belt 100 is translated along its rotational path.

Referring briefly back to FIG. 4, each carriage 78, 80 includes a shaft 81, 83, respectively, that is connected to a pair of cam rollers 85, 87 and 89, 91, respectively. The cam rollers 85, 89 are configured to roll along guide track 93, whereas cam rollers 87, 91 are configured to roll along guide track 95. In this regard, the cam rollers 85, 87, 89, and 91 function to maintain the position of the belt 90 as the belt 90 is translated.

Referring back to FIG. 2, in one embodiment, the sealing station 30 includes a lift mechanism 104 similar to that shown for the formation station 18 shown and described above with respect to FIG. 4. At sealing station 30, the lift mechanism 104 functions to raise and lower a tool in the form of a sealing anvil, which is used in sealing the upper and lower webs together in a manner as is known.

As further shown in FIGS. 2-3, the lower web 14 of flexible material is advanced from supply roll 16 through the formation station 18, the loading station 22, and to the upper web supply station 26 by a pair of belts 106, 108. Each belt 106, 108 is spliced to have separate belt portions 110, 112 and 114, 116, respectively. Each belt portion carries an array of clamps 118 that selectively grip and release the lower web 14 of flexible material. The belts 106, 108 are trained about a respective pair of pulleys, of which pulleys 120, 122 associated with belt 106 are seen in FIGS. 2, 5, and 6. One of the pulleys 124 associated with belt 108 may be seen in FIG. 3. In a preferred embodiment, pulley 120, which is a drive pulley driven by motor assembly 126, is located at or near the upper web station 24, whereas pulley 122 is a driven pulley posited at or near the supply roll 16. It is understood that pulley 122 may be driven by a motor assembly. Further, it is also contemplated that both pulleys 120, 122 may be separately motor driven. In a similar manner, pulley 124 is also a driven or idler pulley and is rotated by a separate drive pulley (not shown), opposite of drive pulley 120, via translation of belt 108.

Figure 7:
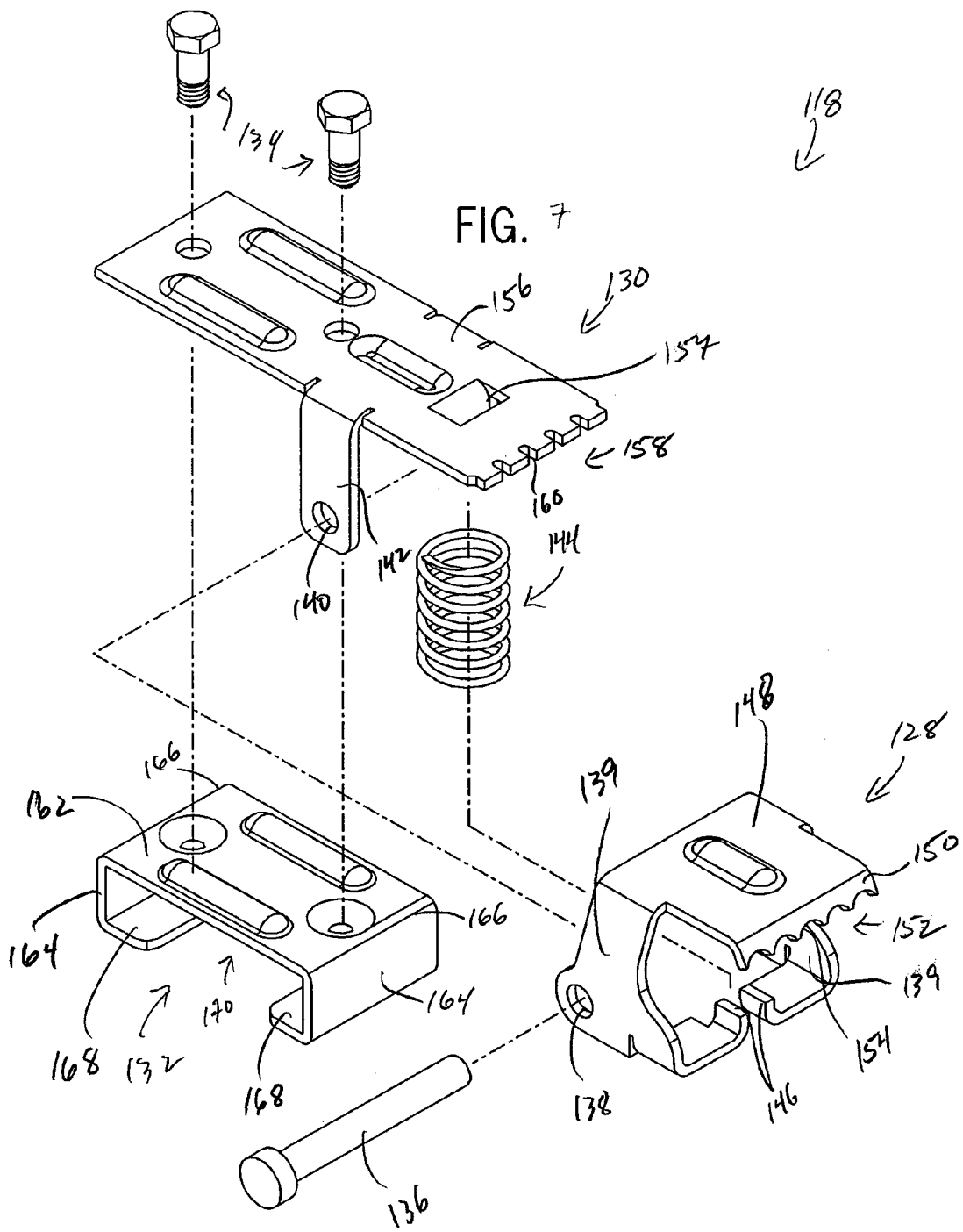
FIG. 7 is an exploded view of a web clamp used in the packaging machine of FIG. 1.

As described above, belts 106, 108 each carry a series of clamps 118 that are designed to grip the web 14 of flexible material and maintain that grip during the packaging process. As illustrated in FIG. 7, each clamp 118 is composed of an upper jaw member 128 and a lower jaw member 130. The lower jaw member 130 is coupled to a channel guide member 132 by a pair of bolts 134. A pivot pin 136 may be extended through openings 138 in sidewalls 139 of the upper jaw member 128 and openings 140 formed in a pair of downwardly extending tongues of lower jaw member 130, of which only one tongue 142 is shown, to connect the upper jaw member 128 and the lower jaw member 130 to one another. Spring 144 engages spaced and upwardly facing flanges 146 of the upper jaw member 128 to centrally position the spring 144 relative to the upper jaw member 128 and the lower jaw member 130.

The upper jaw member 128 has a relatively flat upper wall 148 with a sloped face 150 extending therefrom. The sloped face 150 or front wall has a serrated leading edge 152 that defines a series of gripping teeth 154. The lower jaw member 130 also a relatively flat upper wall 156, but lacks the sloped face of the upper jaw member. The flat upper wall 156 has an alignment guide 157 with downwardly extending flanges (not shown) that extend into the spring 144 to align the spring 144 with the lower jaw member 180. These flanges are similar to the upwardly extending flanges 146 of the upper jaw member.

Similar to the upper wall 148 of the upper jaw member 128, the flat upper wall 156 of the lower jaw member 130 also has a serrated leading edge 158 defining a series of gripping teeth 160 that work in tandem with the gripping teeth 154 of the upper jaw member 128 to grip the web of flexible material 14. The upper jaw member 128 may be controlled in a known manner, such as by means of a cam-type opening mechanism, to pivot downward about pivot pin 136 and against the bias of spring 144 to allow the web of flexible material to be positioned between the upper jaw member 128 and the lower jaw member 130. After the clamps 118 are moved out of engagement with the opening mechanism, the bias of spring 144 functions to close upper jaw member 128 and lower jaw member 130 together, such that the teeth 154, 160 clamp the web material therebetween. As shown in FIG. 3, the web of flexible material is gripped along a plane that is generally parallel and between the plane of the upper walls 148, 156 of the upper jaw member and the lower jaw member, respectively.

The channel guide member 132 has a relatively flat upper wall 162 and a pair of legs 164 extending downwardly from the edges 166 of the upper wall 162 at an angle that is perpendicular to the plane of the upper wall 162. Each leg 164 has an arm 168 extending perpendicularly from the leg 164 and in a plane parallel to that of the upper wall 162. The upper wall 162, legs 164, and arms 168 collectively define a receiver that allows each clamp to fit with a guide rail of the packaging machine (not shown).

To couple the clamp 118 to the belt 108, for example, the belt is passed between the lower jaw member 130 and the channel guide member 132. Bolts 134 are then used to fasten the lower jaw member 130 to the channel guide member 132. When the bolts are tightened, the belt 108 is pinched between the lower jaw member 130 and the channel guide member 132.

Figure 8:
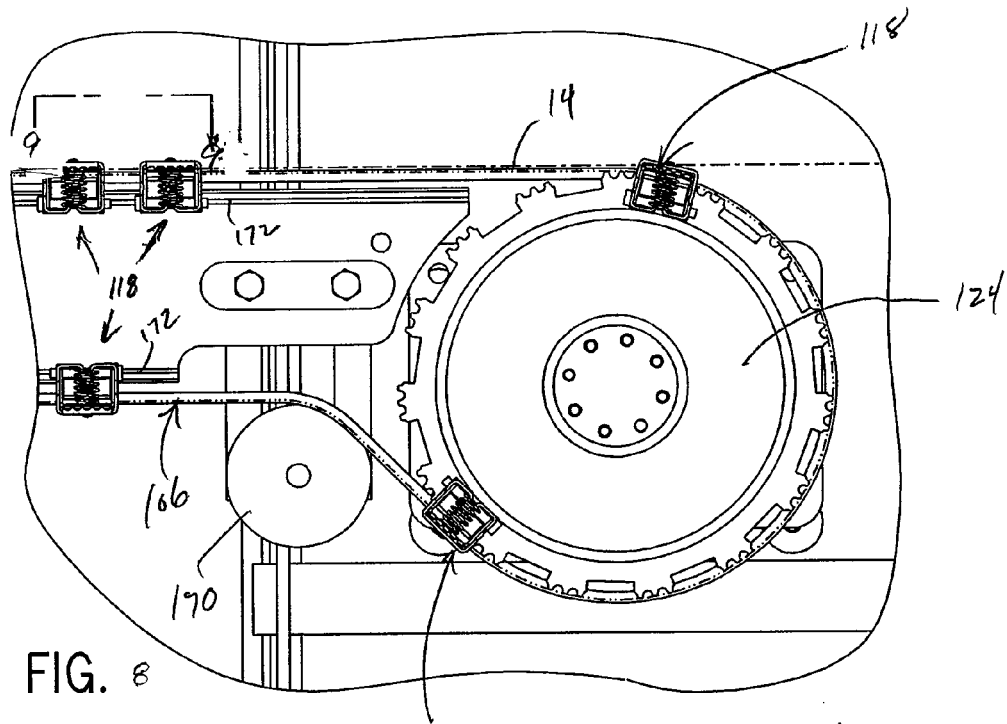
FIG. 8 is a section view of the packaging machine of FIG. 1 taken along line 8-8 of FIG. 3.

Referring now to FIG. 8, an enlarged view of a portion of the formation station 18 shows belt 106 trained through guide roller 170 and around driven pulley 124. As shown in the figure, the clamps 118 remain connected to the belt 106 as the belt is translated by the driven pulley 124 and the drive pulley 120 (FIG. 2). The clamps 118 are designed to rotate with the belt in the closed position when web material is not being gripped. When belt 106 passes by the web supply roll 16, the clamps 118 are opened in a known manner such that the gripping teeth of the upper and lower jaw members 128, 130 allow the web of flexible packaging material to enter into the space between the open jaw members 128, 130. As the belt 106 moves past the web supply station 24, the spring 144 moves the jaw members 128, 130 to the closed position, so that the web of flexible material is clamped between the jaw members 128, 130 and is advanced with the belt 108, typically in an indexing manner although it is understood that the web of material may also be advanced in a continuous manner. As further shown, the clamps 118 are designed to ride along a guide rail 172 formed in the frame of the packaging machine 10 to maintain consistent travel of the belt 108.

Figure 9:
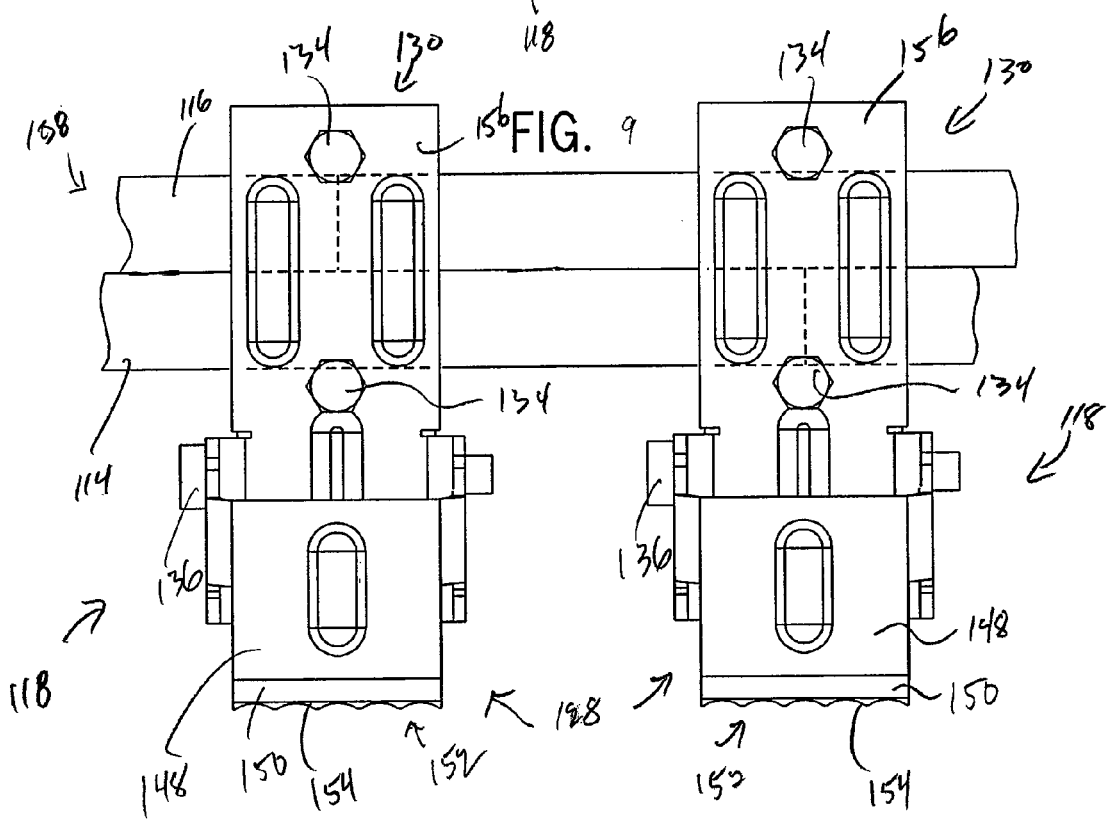
FIG. 9 is a section view of the packaging machine of FIG. 1 taken along line 9-9 of FIG. 8.

As noted above, in a preferred embodiment, the belts 106, 108 are each spliced to define respective belt portions. This splicing of belt 106 into belt portions 114, 116 is particularly illustrated in FIG. 9. In a preferred embodiment, the spliced areas of the belt portions 114, 116 are also axially offset or staggered. As shown in the figure, one of the clamps 118 will retain one of the spliced areas of one of the belt portions 114, 116, and the spliced area of the other of the belt portions 114, 116 will be located at a different one of the clamps 118. That is, one of the clamps 118 functions to clamp the splice in one of the belt portions 114, 116 where the clamp 118 is secured to the belt portions 114, 116, and the splice in the other of the belt portions 114, 116 is located at a different one of clamps 118. The splices in the belt portions 114, 116 may be at adjacent clamps 118, or may be at any pair of clamps 118 that are axially offset from each other. In this manner, the stress experienced by the splice in the belt 106 is distributed over two laterally offset locations, which enables the splicing function to be carried out by the clamps 118 without modification or reinforcement, and also without the need for a dedicated belt splice. While the belt 106 is shown and described as being split into two portions, it is also understood that any other number of belt portions greater than one may be employed while taking advantage of the offset belt splice function as shown and described.

As was noted with respect to FIG. 2, the packaging machine 10 includes two belts 106, 108 spaced from one another and each including clamps 118 to grip and advance the web 14 of flexible material from the supply roll 16 through the various stations of the packaging machine. In one embodiment, optical sensors are used to provide feedback to motor controllers (not shown) for the respective motors (motor 126 for belt 106) so that operation of the motors for each belt can be synchronized. It is recognized that other types of sensors may also be used to provide positional feedback to the motor controllers for motor synchronization. Alternately, a single motor could be used to drive the drive pulleys and thus the belts.

Various alternatives and modifications are contemplated as being within the scope of the following claims particularly pointing out and distinctly claiming the subject matter regarded as the invention.

We claim:

1. A lift mechanism for a tool in a packaging apparatus in which cavities are formed in web material for receiving products to be packaged, the lift mechanism comprising:
    a pair of arms interconnected with the tool, wherein the pair of arms are movable between a first position and a second position, wherein the pair of arms raise the tool when moved from the first position to the second position;
    a slave drive that includes a flexible driven member coupled to the pair of arms and adapted to translate between a third position and a fourth position, wherein the slave drive moves the pair of arms from the first position to the second position so as to raise the tool when the flexible driven member is translated from the third position to the fourth position and moves the pair of arms from the second position to the first position so as to lower the tool when translated from the fourth position to the third position; and
    a master drive coupled to the slave drive and adapted to translate the flexible driven member between the third and fourth positions.

2. The lift mechanism of claim 1 wherein the slave drive and the master drive are interconnected by a rotatable driven member that when rotated in a first direction causes the flexible driven member to translate from the third position to the fourth position.

3. The lift mechanism of claim 2 wherein the rotatable driven member is further adapted to rotate in a second direction, which causes the flexible driven member to translate from the fourth position to the third position.

4. The lift mechanism of claim 3 wherein the master drive includes a drive member and a driving belt associated with the drive member and the rotatable driven member, and wherein rotation of the drive member in a first direction causes the driving belt to rotate the rotatable driven member in a first direction of rotation.

5. The lift mechanism of claim 4 wherein rotation of the drive member in a second direction causes the driving belt to rotate the rotatable driven member in a second direction of rotation opposite the first direction of rotation.

6. The lift mechanism of claim 1 wherein translation of the flexible driven member from the third position to the fourth position causes a distance between the pair of arms to narrow and translation of the flexible driven member from the fourth position to the third position causes the distance between the pair of arms to widen.

7. The lift mechanism of claim 1, wherein the flexible driven member is a belt.

8. A lift mechanism for a tool in a packaging apparatus in which cavities are formed in web material for receiving products to be packaged, the lift mechanism comprising:
a pair of arms interconnected with the tool, wherein the pair of arms are movable between a first position and a second position, wherein the pair of arms raise the tool when moved from the first position to the second position;
a slave drive coupled to the pair of arms and adapted to translate between a third position and a fourth position, wherein the slave drive moves the pair of arms from the first position to the second position so as to raise the tool when translated from the third position to the fourth position and moves the pair of arms from the second position to the first position so as to lower the tool when translated from the fourth position to the third position; and
a master drive coupled to the slave drive and adapted to translate the slave drive between the third and fourth positions;
wherein the slave drive and the master drive are interconnected by a rotatable driven member that when rotated in a first direction causes the slave drive to translate from the third position to the fourth position;
wherein the driven member is further adapted to rotate in a second direction opposite the first direction, which causes the slave drive to translate from the fourth position to the third position;
wherein the master drive includes a drive member and a driving belt associated with the drive member and the driven member, and wherein rotation of the drive member in a first direction causes the driving belt to rotate the driven member in the first direction;
wherein rotation of the drive member in a second direction causes the driving belt to rotate the driven member in the second direction; and
wherein the slave drive includes a driven belt associated with the driven member and wherein rotation of the driven member in the first direction causes the driven belt to translate from the third position to the fourth position.

9. The lift mechanism of claim 8 wherein rotation of the driven member in the second direction causes the driven belt to translate from the fourth position to the third position.

10. The lift mechanism of claim 9 wherein the drive member includes a shaft that is rotated by a drive motor.

11. A tool apparatus for a packaging assembly, the tool apparatus comprising:
a tool adapted to act on a web of packaging material; and
a lift mechanism operatively associated with the tool and adapted to move the tool between a lowered position and a raised position, the lift mechanism including:
a pair of arms with which the tool is interconnected;
a flexible driven member with which the pair of arms are interconnected, the flexible driven member being movable between a first position and a second position along a linear path that is generally perpendicular to the direction of movement of the tool, wherein the flexible driven member positions the tool at the lowered position when moved to the first position and positions the tool at the raised position when moved to the second position; and
a master drive interconnected with the flexible driven member and operative to move the flexible driven member along the linear path between the first position and the second position.

12. The tool apparatus of claim 11 wherein the tool apparatus includes a rotatable driven member, wherein the flexible driven member is a belt that is caused to translate along the linear path by rotation of the rotatable driven member and wherein the master drive includes a pulley that is connected to and causes rotation of the rotatable driven member.

13. The tool apparatus of claim 12 wherein the pulley is motor driven.

14. The tool apparatus of claim 12 wherein rotation of the rotatable driven member in a first direction causes the pair of arms to move the tool from the lowered position to the raised position.

15. The tool apparatus of claim 14 wherein rotation of the rotatable driven member in a second direction causes the pair of arms to move the tool from the raised position to the lowered position.

16. A packaging apparatus comprising:
a web supply containing a sheet of web material;
a web advancement assembly associated with the web supply; and
a cavity tool adapted to act on the sheet of web material; and
an operating mechanism for reciprocating the tool between a lowered position and a raised position, wherein the operating mechanism includes a pair of arms operatively coupled to a flexible driven member in a cooperative spaced arrangement, wherein movement of the arms toward one another by the flexible driven member raises the tool and movement of the arms away from one another by the flexible driven member lowers the tool.

17. The packaging apparatus of claim 16 wherein the operating mechanism includes a master-slave arrangement and wherein rotation of a master causes linear translation of the flexible driven member.

18. The packaging apparatus of claim 17 wherein rotation of the master in a first rotational direction causes the flexible driven member to move the arms toward one another and rotation of the master in a second rotational direction causes the flexible driven member to move the arms away from one another.

19. The packaging apparatus of claim 18 wherein the master includes a drive wheel and a drive belt operatively associated with the drive wheel and a driven wheel that is operatively associated with the flexible driven member.

20. The packaging apparatus of claim 19 wherein the flexible driven member is a belt that is trained around a follower and the driven wheel.

21. The packaging apparatus of claim 17 wherein the tool comprises a cavity forming box for forming a cavity in the web material when in the raised position.

22. The packaging apparatus of claim 16, wherein each arm includes an upper end and a lower end, wherein the upper end of each arm is interconnected with the tool, and wherein the flexible driven member includes an upper run and a lower run, wherein the lower end of a first one of the arms is secured to the lower run of the flexible driven member and the lower end of a second one of the arms is secured to the upper run of the flexible driven member, wherein movement of the flexible driven member causes the arms to move in opposite directions to move the tool between the raised and lowered positions.

\* \* \* \* \*